Aug. 8, 1950  H. J. OTIS  2,518,170
TRACTION CLAMP FOR TIRES
Filed Sept. 2, 1947
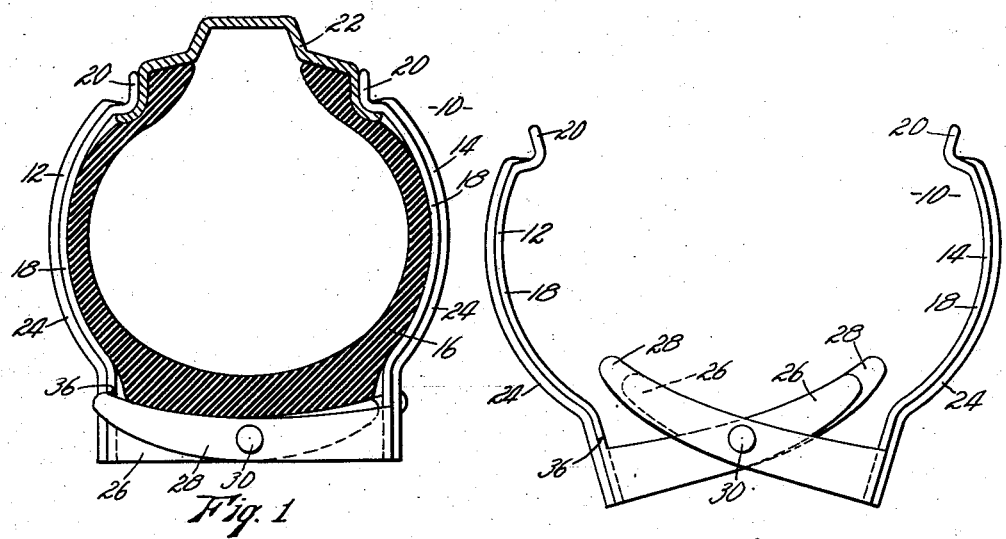
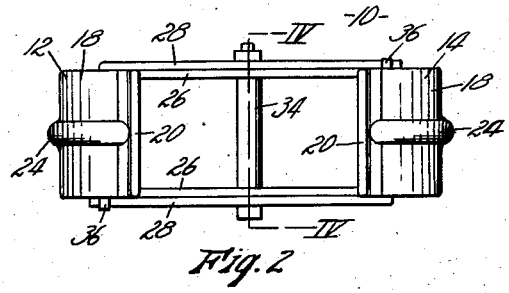
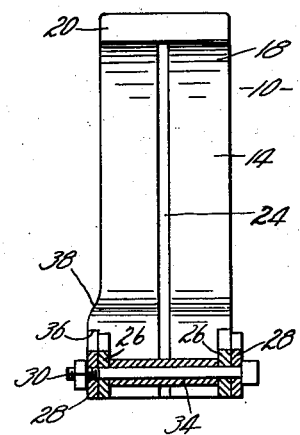
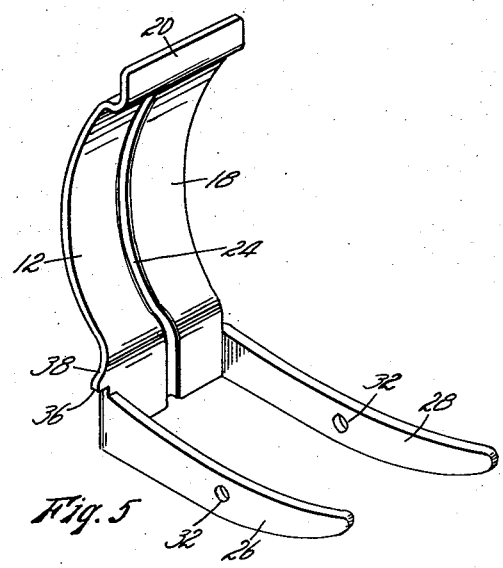
INVENTOR,
Howard J. Otis.
BY
Roy E. Hamilton,
Attorney.

Patented Aug. 8, 1950

2,518,170

UNITED STATES PATENT OFFICE 2,518,170

TRACTION CLAMP FOR TIRES

Howard J. Otis, Kansas City, Mo.

Application September 2, 1947, Serial No. 771,686

5 Claims. (Cl. 152—225)

This invention relates to new and useful improvements in traction clamps for tires, and has as its principal object the provision of a tire clamp having two pivotally joined clamp members adapted to be fitted about the tire of an automobile, said members being so disposed that the weight of the automobile causes said clamp to grip said tire tightly.

Another object is the provision, in a traction clamp of the class described, of means for interlocking said clamp members in such a manner that the clamp is securely retained on the tire when no weight is being supported by said clamp.

Other objects are simplicity and economy of construction, ease of application by unskilled persons, efficiency of operation, and durability.

With these objects in view, as well as other objects which will appear in the course of the specification, reference will be had to the drawing, wherein:

Figure 1 is a side view of a traction clamp embodying the present invention, operatively mounted on an ordinary automobile tire shown in cross-section.

Fig. 2 is a plan view of the clamp.

Fig. 3 is a side elevation of the clamp shown expanded preparatory to being affixed to a tire.

Fig. 4 is a sectional view taken on line IV—IV of Fig. 2.

Fig. 5 is a perspective view of one of the two identical members comprising the clamp.

Like reference numerals apply to similar parts throughout the several views, and the numeral 10 refers to a traction clamp for tires comprising two identical clamp members 12 and 14 constructed preferably of a heavy gauge sheet metal. Said clamp is adapted to fit clampingly about the ordinary automobile tire 16 as shown in Fig. 1, and each of clamp members 12 and 14 has a relatively broad leg 18 arcuately concave at its inner face to engage the side walls of said tire, and having its upper end portion 20 formed to engage tire rim 22 as shown in Fig. 1, or in other positions, if desired. A reinforcement rib 24 is formed longitudinally in each of legs 18 for additional rigidity.

Clamp members 12 and 14 are formed to present inwardly extending fingers 26 and 28 disposed at the opposite edges of leg 18 at the lower end thereof, fingers 28 being somewhat longer than fingers 26. Members 12 and 14 are pivotally joined with the fingers of said members extending in opposite directions, by any suitable means such as a bolt 30 extending through all four of said fingers through holes 32 provided therein at a point disposed centrally between legs 18, as shown in Fig. 5. It will be noted that the shorter fingers 26 of each clamp member is disposed at the inner side of the longer fingers 28 of the opposite clamp member. A spacer tube 34 is carried on bolt 30 between fingers 26 to maintain said fingers in properly spaced relation.

Fingers 26 are short to avoid striking leg 18 of the opposite clamp member. The longer fingers 28 extend beyond leg 18 of the opposite clamp member at the edge thereof, and move in sliding relation against said edge when the clamp members are pivoted on bolt 30. The edge of leg 18 of each clamp member is offset outwardly to provide a shoulder 36, normally securing fingers 28 from pivoting upwardly to expand the clamp as shown in Fig. 2. The clamp members are thus interlocked to secure the clamp to the tire. In order to remove the clamp from the tire, or to apply it, the end portions of fingers 28 must be pried outwardly sufficiently to clear shoulders 36. The tip of a screwdriver may be used for this purpose. The clamp may then be expanded to the position shown in Fig. 3. In applying the clamp, legs 18 are pressed around the tire till the end portions of fingers 28 snap resiliently into position beneath shoulders 36. The upper portion of shoulder 36 is bevelled at 38 to permit fingers 28 to slide easily thereover.

The upper edges of fingers 26 and 28 are arcuately concave, and extend transversely across the tread of tire 16. It will be noted that the upper edge of the end portion of each of fingers 26 and 28 extends above the upper edge of the base portion of the adjacent finger. Consequently the weight of the tire, and what is carried by the tire, is supported principally on the end portions of said four fingers. Thus whenever the tire turns to a point where the clamp contacts the roadway and supports weight, said fingers act as levers having bolt 30 as a fulcrum to force legs 18 into clamping engagement with the sidewalls of the tire. The lower edges of the outer portion of said fingers are curved upwardly from the roadway so as not to interfere with said lever action.

Thus it is apparent that a simple durable, efficient means for providing traction for automobile wheels on unfavorable roadway surfaces has been described. The lower edges of fingers 26 and 28, having relatively small area, will bite into icy surfaces and prevent slippage. On soft surfaces such as mud, sand, or gravel, the fingers will sink into the surface, and the relatively broad side surface thereof will then abut against the material of the roadway for better traction.

It is contemplated that a plurality of clamps 10 will be secured to tire 16 at spaced intervals therearound, the number and spacing thereof depending on the condition of the road surface.

What I claim as new and desire to protect by Letters Patent is:

1. A traction clamp for tires comprising two substantially arcuate members pivotally joined to form a C-clamp adapted to fit closely about a tire with said pivot disposed adjacent the tread of said tire, each of said clamp members being extended past said pivot point and having said extended portion disposed inwardly from the adjacent portion of the opposite clamp member when the clamp is positioned on the tire, whereby the weight of the tire will be supported on said extended portions and said clamp members will be operated by said weight to clamp said tire securely.

2. A traction clamp for tires comprising a pair of clamp members having arcuate legs adapted to engage the sidewalls of a tire, and a finger extending inwardly from each edge of each of said legs at the outer end thereof, said fingers of opposing clamp members extending in opposed, crossed relationship transversely across the tread of the tire and pivotally connected at a point intermediate their ends on an axis substantially tangent to said tire and the portions of said fingers extending past said pivot being disposed inwardly from the adjacent portions of the fingers of the opposite clamp member when said clamp is positioned on said tire.

3. A traction clamp for tires comprising a pair of clamp members having arcuate legs adapted to engage the sidewalls of a tire, and a finger extending inwardly from each edge of each of said legs at the outer end thereof, said fingers of opposing clamp members extending in opposed, crossed relationship transversely across the tread of the tire and pivotally connected at a point intermediate their ends on an axis substantially tangent to said tire, the end portions of each of said fingers normally being disposed inwardly from the base portion of the adjacent finger of the opposite clamp member when said clamp is positioned on said tire, whereby the weight of the tire will be supported on said end portions and will cause said clamp members to act as levers having said pivot as a fulcrum to grip said tire securely.

4. A traction clamp for tires comprising a pair of clamp members pivotally joined to form substantially a C-clamp adapted to fit closely about a tire, said clamp being operable by the weight of the tire to clamp said tire firmly, said clamp members being extended past said pivotal connection, said extended portion being adapted to be transversely deflected by a cam formed by the opposite clamp member as said C-clamp is closed, and to move resiliently into engagement with a shoulder formed adjacent said cam, thereby securing said C-clamp against opening.

5. A traction clamp for tires comprising a pair of resilient members each having an arcuate leg adapted to engage the sidewall of a tire, and fingers extending inwardly from the outer end of each of said legs to lie transversely across the tread of said tire, a longitudinal edge of each of said legs being formed to present a transversely projecting cam adjacent the outer end thereof and an outwardly facing shoulder adjacent said cam, and means pivotally joining the fingers of said clamp members at the midline of said tire, one of the fingers of each clamp member projecting beyond said pivot point and resting in sliding engagement with a longitudinal edge of the leg of the opposite clamp member, whereby when the traction clamp is closed, said extended fingers will be deflected transversely by said cams and be engaged by said shoulders.

HOWARD J. OTIS.

REFERENCES CITED

The following references are of record in the file of this patent:

UNITED STATES PATENTS

| Number | Name | Date |
|---|---|---|
| 1,499,036 | Smith | June 24, 1924 |